United States Patent [19]
Nakashima

[11] Patent Number: 5,982,952
[45] Date of Patent: Nov. 9, 1999

[54] OPTICAL CHARACTER READER WITH TANGENT DETECTION FOR DETECTING TILT OF IMAGE DATA

[75] Inventor: Yutaka Nakashima, Tokyo, Japan

[73] Assignee: NEC Corporation, Tokyo, Japan

[21] Appl. No.: 08/720,324

[22] Filed: Sep. 27, 1996

[30] Foreign Application Priority Data

Sep. 28, 1995 [JP] Japan .................................. 7-251549

[51] Int. Cl.⁶ .................................................. G06K 9/36
[52] U.S. Cl. .......................... 382/289; 382/181; 382/185; 382/190; 382/290; 382/321; 348/193; 348/194; 348/358; 348/453
[58] Field of Search .................................. 382/162, 164, 382/167, 181, 185, 186, 193, 194, 187, 289, 290, 321; 348/453, 358

[56] References Cited

U.S. PATENT DOCUMENTS

| | | | |
|---|---|---|---|
| 4,558,461 | 12/1985 | Schlang | 382/9 |
| 5,020,117 | 5/1991 | Oai et al. | 382/34 |
| 5,031,225 | 7/1991 | Tachikawa et al. | 382/21 |
| 5,058,182 | 10/1991 | Kuan et al. | 382/20 |
| 5,633,954 | 5/1997 | Gupta et al. | 382/181 |
| 5,638,462 | 6/1997 | Shirakawa | 382/186 |

FOREIGN PATENT DOCUMENTS

| | | |
|---|---|---|
| 0 287 027 | 10/1988 | European Pat. Off. . |
| 0 308 673 | 3/1989 | European Pat. Off. . |
| 0 434 415 A2 | 6/1991 | European Pat. Off. . |
| 61-160180 | 7/1986 | Japan . |
| 62-281084 | 5/1987 | Japan . |
| 2-116987 | 5/1990 | Japan . |
| 4-584 | 1/1992 | Japan . |
| 5-35841 | 2/1993 | Japan . |

OTHER PUBLICATIONS

"Document Image Structural Analysis by Split Detecting Methods", p. 491–198, vol. 4, 1991, Institute of Electronics, Information and Communications Engineers.

M. Hamanaka, et al., "Normalization–cooperated Feature Extraction Method for Handprinted Kanji Character Recognition", Pattern Recognition Res. Lab., pp. 1, 3, 5, 1993.

*Primary Examiner*—Christopher S. Kelley
*Assistant Examiner*—Sheela Chawan
*Attorney, Agent, or Firm*—Scully, Scott Murphy & Presser

[57] ABSTRACT

A character reader comprises an input unit for reading characters by a scanner-typed photoelectric transfer unit as an image, creating the image data formed by binary pixel of white and black lying on the plain surface and entering the same, a tangent detecting unit for detecting tangent information on tangents contacting with black pixels forming a character string within the image data, a tilt deciding unit for deciding a representative tangent which is representative for the direction of a row of character string, from the above-mentioned tangents, on the basis of the tangent information detected by the tangent detecting unit.

9 Claims, 8 Drawing Sheets

OPTICAL CHARACTER READER WITH TANGENT DETECTION FOR DETECTING TILT OF IMAGE DATA

BACKGROUND OF THE INVENTION

1. Field of the Invention

The present invention relates to a character reader for entering characters into a word processor or the like, and particularly to an optical character reader (hereinafter, referred to as an OCR) for reading and entering characters written on paper or the like by optical methods.

2. Description of the Related Art

As a means of entering characters into a word processor or the like, an OCR is used in some cases to read and enter the characters written on paper or the like automatically, without typing with a keyboard. Input of the characters by means of an OCR involves the steps of reading the characters on paper or the like with a scanner to convert them into image data, analyzing the layout of the image data to discern the character portion and recognizing the characters by the technique of pattern recognition. In entering the characters by means of an OCR, however, if the direction of the image input portion of a scanner tilts on the surface of the paper having the characters written thereon at the time of reading the characters with a scanner, thereby to cause the tilt in the readout image. Accordingly, there have been such problems that the characters can't be correctly discerned by the layout analysis and the performance of recognition is decreased because of recognition processing being performed with the characters tilted.

As countermeasures of these problems, there have been various conventional techniques to improve the recognition performance by detecting the characters tilting on the paper and correcting the detected tilt. In this kind of the conventional technique for use in an OCR, for example, "A Character String Direction Discrimination Device" (Article 1) is disclosed in Japanese Patent Laid-Open No. 61-160180. A character reader described in the same patent, comprises a photoelectric converter for converting characters from analog data to digital data by photoelectric methods so as to deliver the quantum signals, an image data storing unit for storing the delivered quantum signals as image data, a marginal distribution creating unit for requiring a histogram obtained by performing projection as for one region or more within the stored image from several directions and accumulating the density, and a character direction judging unit for judging the direction of the character string on the basis of the created histogram. The character reader requires a histogram of black pixel by the projection performed on the character string from several directions and finds the sharpest portion in the directions, which is recognized as the tilt of the above character string.

As another conventional technique, "A Character Reader" (Article 2) is disclosed in Japanese Unexamined Patent Publication (Kokai) No. Heisei 2-116987. The character reader described in the same patent comprises an input means for entering image data, an extracting means for extracting character string from the entered image data, a character discerning means for discerning each character from the extracted character string, and a reference line extracting means in which assuming a certain straight line passing a specified position like the lower end portion of a circumscribed rectangle of each character having been discerned, a histogram on the parameter space is required as for a set of parameter defining this straight line and the tilt on the straight line which is defined by a set of parameter providing with the maximum frequency on the histogram is regarded as the tilt on the character string. The character reader once scans the whole image data to be entered, requires a histogram on a parameter space by assuming the above specified straight line, after roughly discerning the characters, and recognizes the tilt on the character string on the basis of the required histogram.

As described above, the conventional character reader has a drawback that it takes much time in processing because the processing amount becomes huge in case of recognizing the tilt on the character string in order to improve accuracy of character recognition.

More specifically, the conventional character reader described in the article 1 requires a histogram of black pixel by the projection performed from several directions for all the black pixels in order to improve accuracy, with the result that processing amount becomes huge.

Additionally, since the processing amount for requiring a set of parameter defining a straight line which passes a specified position of a circumscribed rectangle of each character, is proportional to the number of characters, processing amount becomes enormous when there are many characters.

SUMMARY OF THE INVENTION

A first object of the present invention is to provide a character reader capable of improving accuracy of character recognition by recognizing the tilt of image data and correcting the same so as to perform character recognition, without requiring a histogram of black pixel by the projection performed from several directions as for all the black pixels, discerning the characters from the image data and scanning the whole image data in order to require the tilt.

A second object of the present invention is, in addition to the first object, to provide a character reader capable of decreasing the processing amount for detecting and correcting the tilt of the image data so to improve the processing speed, by removing the steps of requiring a histogram of black pixel by the projection from several directions as for all the black pixels in order to detect the tilt on the image data, discerning the characters from the image data and scanning the whole image data in order to require the tilt.

According to one aspect of the invention, a character reader for reading and entering characters by optical methods, comprises:

an input means for reading characters by a scanner-typed photoelectric transfer means as an image, creating the image data formed by binary pixel of white and black lying on the plain surface, and entering the same;

a tangent detecting means for detecting tangent information on tangents contacting with black pixels forming a character string within the image data; and a tilt deciding means for deciding a representative tangent which is representative for the direction of a row of character string, from the above-mentioned tangents, on the basis of the tangent information detected by said tangent detecting means.

In the preferred construction, the tilt deciding means may decide such a tangent as the representative tangent that the distance between two contact points specifying a tangent is the longest, from the above-mentioned tangents, on the basis of the tangent information detected by said tangent detecting means.

In the preferred construction, the tangent detecting means may define a black pixel first detected by scanning the image data from the top portion by one line in a constant direction as a first black pixel, so to detect a first tangent extending from the first black pixel on the opposite side to the scanning direction, and defines a black pixel at the distal end on the opposite side to a group of black pixels sequentially lying from the first black pixel in the scanning direction as a second black pixel, so to detect a second tangent extending from the second black pixel on the same side as the scanning direction; and the tilt deciding means may decide the longer one of the first and second tangents as the representative tangent.

In another preferred construction, the tangent detecting means includes a reference point detecting means for detecting a first black pixel that is a black pixel first detected by scanning the image data from the top portion by one line in a constant direction and a second black pixel that is a black pixel located at the distal end on the opposite side to a group of black pixels sequentially lying from the first black pixel in the scanning direction, a first quasi-reference detecting means for detecting a third black pixel that is a black pixel first detected by scanning a first region obtained by a predetermined condition on the basis of the coordinates of the first black pixel, from the top portion by one line in the same direction as the scanning direction, and a second quasi-reference detecting means for detecting a fourth black pixel that is a black pixel first detected by scanning the second region obtained by a predetermined condition on the basis of the coordinates of the second black pixel, from the top portion by one line in the same direction as the scanning direction; and the tilt deciding means, by comparison between the segment connecting the first black pixel and the third black pixel and the segment connecting the second black pixel and the fourth black pixel, decides the longer segment of the two as the representative tangent.

In another preferred construction, the tangent detecting means may define a black pixel first detected by scanning the image data from the top portion by one line in the direction from left to right as a first black pixel, so to detect a first tangent extending leftward from the first black pixel, and defines a black pixel located at the distal end of a group of black pixels sequentially lying in the scanning direction from the first black pixel as a second black pixel, so to detect a second tangent extending rightward from the second black pixel; and the tilt deciding means may decide the longer one of the first and second tangents as the representative tangent.

In the above-mentioned construction, the tangent detecting means includes a reference point detecting means for detecting a first black pixel that is a black pixel first detected by scanning the image data from the top portion by one line in the direction from left to right and a second black pixel that is a black pixel located at the distal end on the right side of a group of black pixels sequentially lying from the first black pixel in the right direction, a first quasi-reference detecting means for detecting a third black pixel that is a black pixel first detected by scanning a first region extending leftward and downward from the coordinates of the first black pixel, which region is obtained by a predetermined condition, from the top portion by one line in the same direction as the scanning direction, and a second quasi-reference detecting means for detecting a fourth black pixel that is a black pixel first detected by scanning the second region extending rightward and downward from the coordinates of the second black pixel, which region is obtained by a predetermined condition, from the top portion by one line in the same direction as the scanning direction; and the tilt deciding means, by comparison between the segment connecting the first black pixel and the third black pixel and the segment connecting the second black pixel and the fourth black pixel, decides the longer segment of the two s the representative tangent.

Also, the tangent detecting means may require a first region including one distal end of the character string and extending at right angle to the direction of row of the character string with a constant width, and a second region including another distal end of the character string and extending at right angle to the direction of row of the character string with a constant width, define a black pixel first detected by scanning the first region from the top portion of the image data by one line in a constant direction as a first black pixel, and define a black pixel first detected by scanning the second region from the top portion of the image data by one line in a constant direction as a second black pixel; and the tilt deciding means may decide the segment connecting the first black pixel and the second black pixel as the representative tangent.

Preferably, the tangent detecting means may require a first region including the left end of the character string and extending vertically with a constant width, and a second region including the right end of the character string and extending vertically with a constant width, define a black pixel first detected by scanning the first region from the top portion of the image data by one line in the direction from left to right as a first black pixel, and define a black pixel first detected by scanning the second region from the top portion of the image data by one line in the direction from left to right as a second black pixel; and the tilt deciding means may decide the segment connecting the first black pixel and the second black pixel as the representative tangent.

According to another aspect of the invention, a character reader for reading and entering characters by optical methods, comprises:

an input means for reading characters by a scanner-typed photoelectric transfer means as an image, creating the image data formed by binary pixel of white and black lying on the plain surface, and entering the same;

a tangent detecting means for detecting tangent information on tangents contacting with black pixels forming a character string within the image data;

a tilt deciding means for deciding a representative tangent which is representative for the direction of a row of character string, from the above-mentioned tangents, on the basis of the tangent information detected by said tangent detecting means;

a correcting means for correcting the imaged data on the basis of the tilt of the image data obtained by said tilt deciding means; and a recognition means for performing character recognition by the use of pattern matching on the image data corrected by said correcting means.

In the preferred construction, the tangent detecting means may define a black pixel first detected by scanning the image data from the top portion by one line in a constant direction as a first black pixel, so to detect a first tangent extending from the first black pixel on the opposite side to the scanning direction, and defines a black pixel at the distal end on the opposite side to a group of black pixels sequentially lying from the first black pixel in the scanning direction as a second black pixel, so to detect a second tangent extending from the second black pixel on the same side as the scanning direction; and the tilt deciding means may decide the longer one of the first and second tangents as the representative tangent.

In another preferred construction, the tangent detecting means includes a reference point detecting means for detecting a first black pixel that is a black pixel first detected by scanning the image data from the top portion by one line in a constant direction and a second black pixel that is a black pixel located at the distal end on the opposite side to a group of black pixels sequentially lying from the first black pixel in the scanning direction, a first quasi-reference detecting means for detecting a third black pixel that is a black pixel first detected by scanning a first region obtained by a predetermined condition on the basis of the coordinates of the first black pixel, from the top portion by one line in the same direction as the scanning direction, and a second quasi-reference detecting means for detecting a fourth black pixel that is a black pixel first detected by scanning the second region obtained by a predetermined condition on the basis of the coordinates of the second black pixel, from the top portion by one line in the same direction as the scanning direction; and the tilt deciding means, by comparison between the segment connecting the first black pixel and the third black pixel and the segment connecting the second black pixel and the fourth black pixel, decides the longer segment of the two as the representative tangent.

Also, the tangent detecting means may require a first region including one distal end of the character string and extending at right angle to the direction of row of the character string with a constant width, and a second region including another distal end of the character string and extending at right angle to the direction of row of the character string with a constant width, define a black pixel first detected by scanning the first region from the top portion of the image data by one line in a constant direction as a first black pixel, and define a black pixel first detected by scanning the second region from the top portion of the image data by one line in a constant direction as a second black pixel; and the tilt deciding means may decide the segment connecting the first black pixel and the second black pixel as the representative tangent.

Other objects, features and effects of the present invention will be apparent from the following detailed description.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
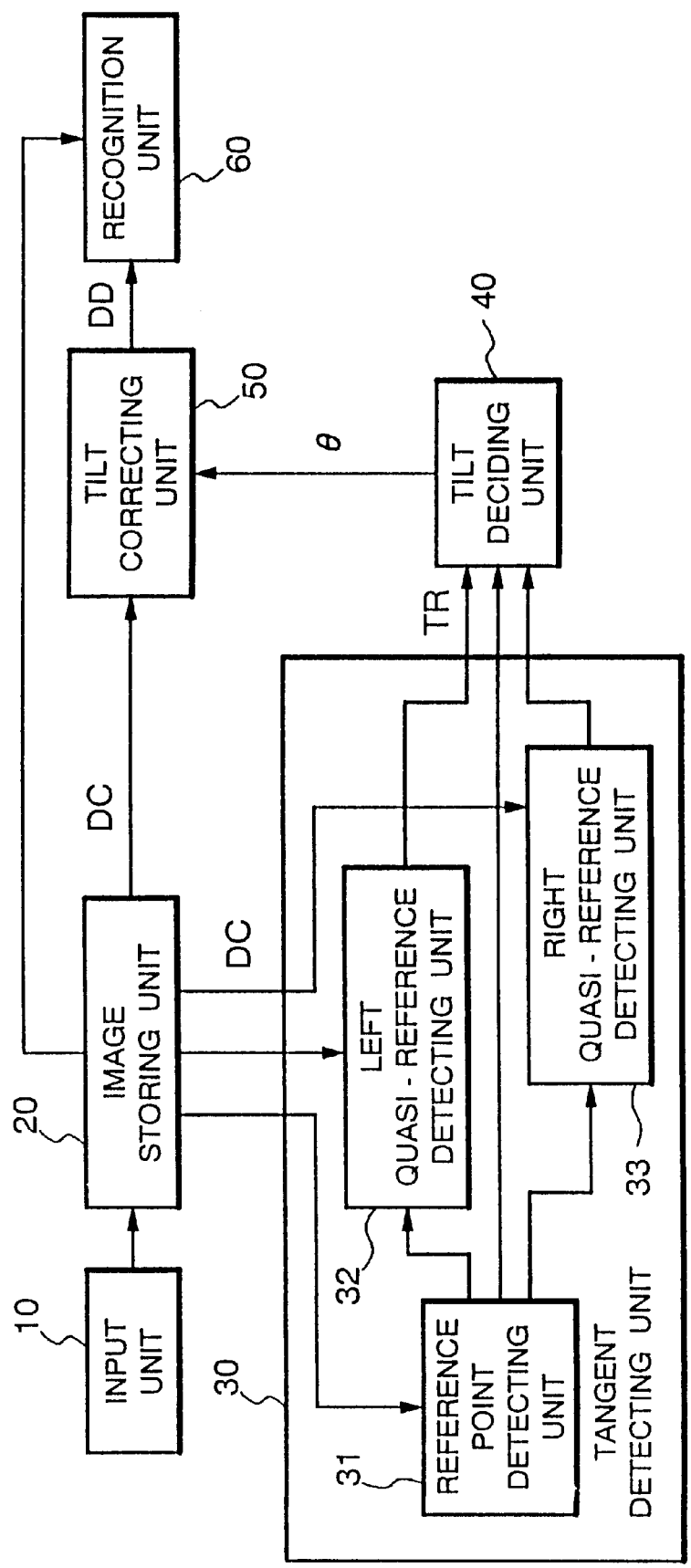
FIG. 1 is a block diagram showing the constitution of a character reader according to a first embodiment of the present invention.

FIG. 1 is a block diagram showing the constitution of a character reader according to a first embodiment of the present invention.

As illustrated in FIG. 1, the character reader of this embodiment comprises an input unit 10 for entering image data of handwritten characters and printed characters, an image storing unit 20 for storing the entered image data, a tangent detecting unit 30 and a tilt deciding unit 40 for detecting a tangent of black pixel forming character of the image data and detecting the tilt of the character string, a tilt correcting unit 50 for correcting the tilt on the image data according to the tilt of the character string decided by the tilt deciding unit 40, and a recognition unit 60 for performing character recognition on the basis of the image data corrected by the tilt correcting unit 50. FIG. 1 shows only the characteristic constitution of the embodiment, and other general constitution thereof is omitted here. It is needless to say that an input device such as a keyboard or the like for entering various instructions and an output device such as a display or the like for displaying the recognition result of the input image and character should be provided with the reader.

The input unit 10 is realized by an image input device such as an image scanner or the like, which reads printed characters on paper or the like as an image, and converts them into image data which is collection of pixels lying on the x-y surface, so to deliver the data to the image storing unit 20. At this time, each pixel of the image data is classified into black pixel or white pixel and expressed, for example, by binary data "0" or "1". More specifically, the portion having character is defined by black pixel and expressed, for example, by data value "1", while the portion having no character (background) is defined by white pixel and expressed, for example, by data value "0".

The image storing unit 20 is realized by an external storage such as a magnetic disk or the like, or an internal memory such as a RAM or the like, which stores the image data delivered from the input unit 10 and supplies the stored image data DC to the tangent detecting unit 30 and the tilt correcting unit 50.

The tangent detecting unit 30 is realized by a CPU controlled by a program, or the like, which detects information (hereinafter, referred to as tangent information) TR on a tangent contacting with a predetermined black pixel among the image date received from the image storing unit 20. The tangent detecting unit 30 includes a reference point detecting unit 31 for detecting a reference point for requiring a tangent of the predetermined black pixel, and a left quasi-reference detecting unit 32 and a right quasi-reference detecting unit 33 for detecting quasi-reference point for specifying the tangent connecting the left and right reference points. A detailed operation of the tangent detecting unit 30 will be explained later.

The tilt deciding unit 40 is realized by a CPU controlled by a program, or the like, which decides a representative tangent on the basis of the tangent information TR detected by the tangent detecting unit 30 and requires the tilt of the character string in the image data according to the tilt of the representative tangent. A detailed operation of the tilt deciding unit 40 will be described later.

The tilt correcting unit 50 is realized by a CPU controlled by a program, which corrects the tilt of the image data DC received from the image storing unit 20 according to the tilt of the character string obtained by the tilt deciding unit 40. More specifically, the image data DC is rotated for the angle θ of the character string received from the tilt deciding unit 40, and creates the corrected image data DD. The created corrected image data DD is supplied to the recognition unit 60.

The recognition unit 60 is realized by a CPU controlled by a program, or the like, which performs a layout analysis on the corrected image data DD by means of division by the use of projective distribution and performs character recognition by means of pattern matching by the use of direction feature extraction. General means can be used for each processing by the recognition unit 60. The description of the layout analysis is found in "Document Image Structural Analysis by Split Detecting Methods" P.491–P.498, vol. 4, 1991, Part 74-D-II, D-II of The Transactions of the Institute of Electronics, Information and Communication Engineers. The structural analysis method of the document image described in this article is a recursive split detecting method which rebuilds a plurality of blocks newly in the region dividing process, and as generalized standard for dividing blocks, it is to introduce variance ratio to the block division by the use of the projective distribution.

Character recognition is described in, for example, "Normalization-cooperated Feature Extraction Method for Handprinted Kanji Character Recognition" in the literature "Pre-Proceedings of the third International Workshop on Frontiers in Handwriting Recognition" (P.343–P.348, 1993).

An operation of the tangent detecting unit 30 will be explained with reference to FIGS. 2 to 6.

Figure 2:
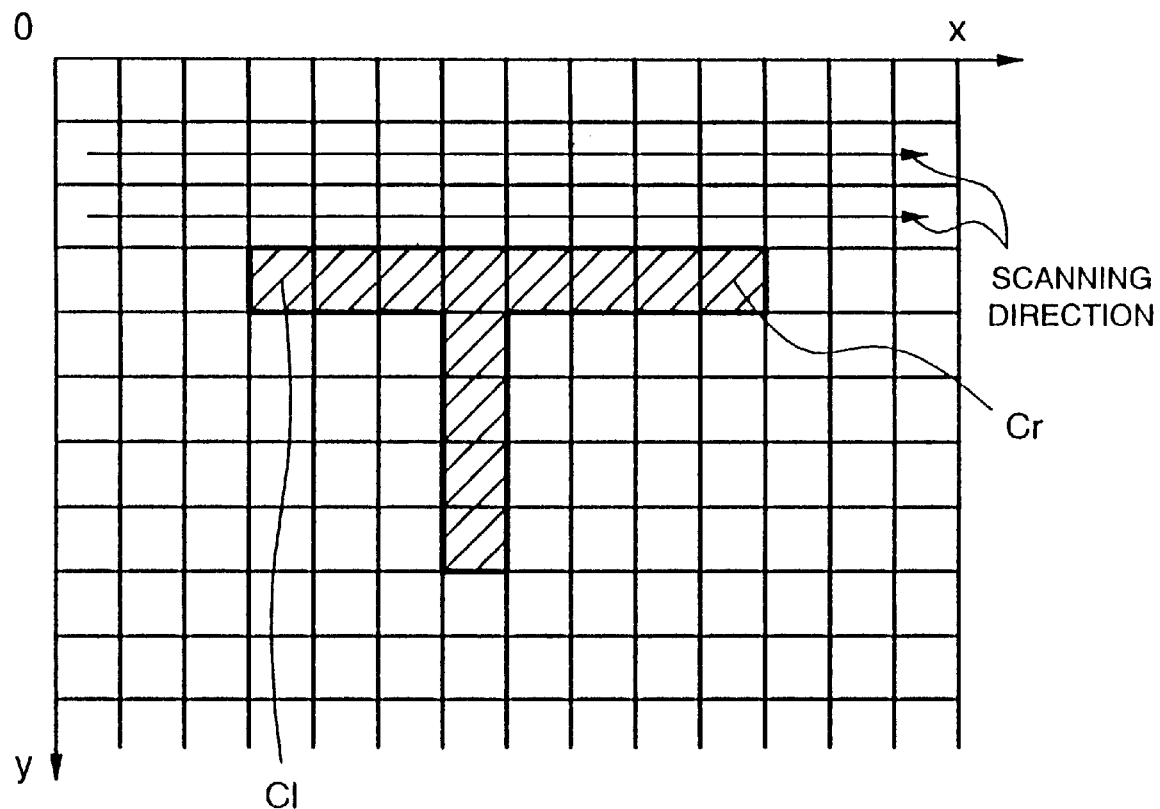
FIG. 2 is a view showing the stored image data received from the image storing unit on the surface X-Y.

FIG. 2 is a view showing the stored image data DC received from the image storing unit 20 on the surface X-Y. In FIG. 2, one square of lattice formed by the straight lines in X direction and Y direction which are coming across at right angle, represents each pixel. In the embodiment, the X-axis represents the direction indicating a row of character string, and the Y-axis represents the direction indicating lines of character string. Specifically, in English documents and Japanese documents written from left to right, the X direction starts from left to right and the Y direction starts from up to down.

The reference point detecting unit 31 scans the image data DC downward from Y=0 by one line, from left to right in the direction of the X-axis, so as to retrieve black pixel. The black pixel detected at first is defined as a left reference pixel Cl. Starting from the reference pixel Cl, the unit 31 detects the sequential black pixels on the same line of the Y coordinate in the right direction. Then, the black pixel located at the right end is defined as a right reference pixel Cr. That is, in a line formed by the black pixels sequentially lying parallel to the X-axis, the left end thereof is defined as a reference pixel Cl and the right end thereof is defined as a reference pixel Cr. When there exist no black pixels sequentially lying on the same line of the Y coordinate as that of the reference pixel Cl, the left reference pixel Cl and the right reference pixel Cr are identified.

Next, the left quasi-reference detecting unit 32 and the right quasi-reference detecting unit 33 detect each reference pixel on the basis of the reference pixels Cl and Cr and the image data DC received from the image storing unit 20.

Figure 3:
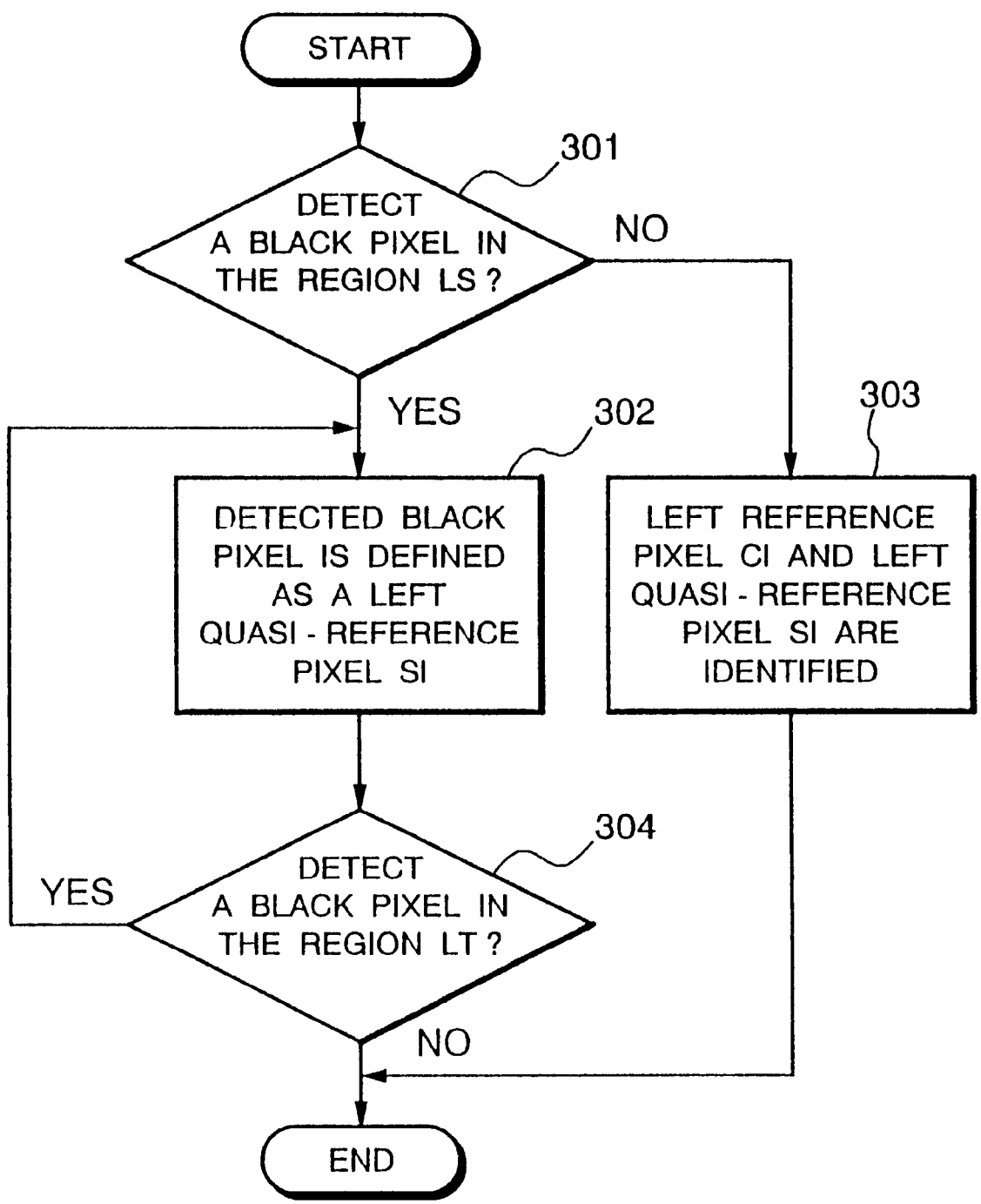
FIG. 3 is a flow chart showing an operation by a left reference detecting unit.

FIG. 3 is a flow chart showing the operation of the left quasi-reference detecting unit 32, and FIG. 4 is a view showing the content of processing by the left quasi-reference detecting unit 32.

The left quasi-reference detecting unit 32 scans the region LS obtained by the following formula (1) on the basis of the coordinates (Xcl, Ycl) of the left reference pixel Cl, along the Y-axis downward from the top by one line and along the X-axis from left to right, until detecting a black pixel.

$$LS=\{(x, y)|x<Xcl, Ycl<y\} \quad (1)$$

Figure 4A:
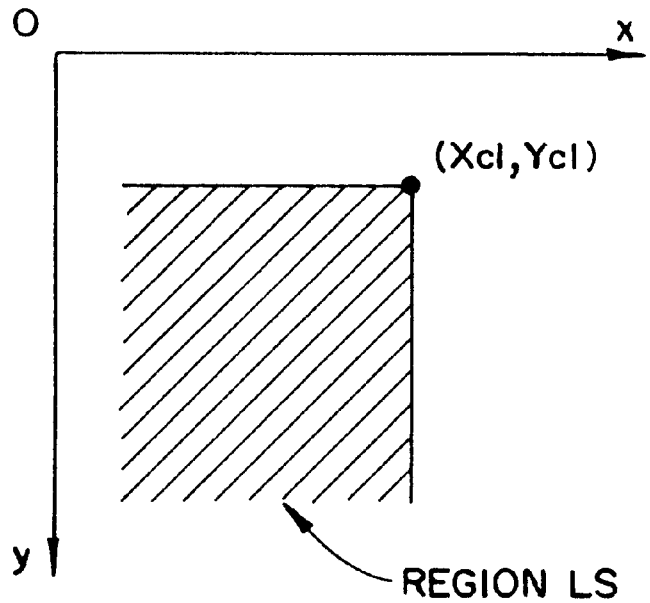
FIG. 4 is a view showing the content of processing by the left reference detecting unit.

FIG. 4(A) shows the region LS (shaded portion). The black pixel first detected in the region LS is temporarily defined as a left quasi-reference point pixel Sl (Steps 301 and 302). When no black pixel is detected, the left reference pixel Cl and the left quasi-reference pixel Sl are identified and the processing is stopped here (Step 303).

When the left quasi-reference pixel Sl is detected in the region LS, the left quasi-reference detecting unit 32 scans the region LT obtained by the following formula (2) on the basis of the line connecting the left reference pixel Cl and the left quasi-reference pixel Sl and the coordinates (Xsl, Ysl) of the left quasi-reference pixel Sl, along the Y-axis downward from the top by one line and along the X-axis from left to right, until detecting a black pixel.

$$LT=\{(x, y)|(Xcl-Xsl)(y-Ycl)<(Ycl-Ysl)(x-Xcl), 0\leq x, Ysl<y\} \quad (2)$$

Figure 4B:
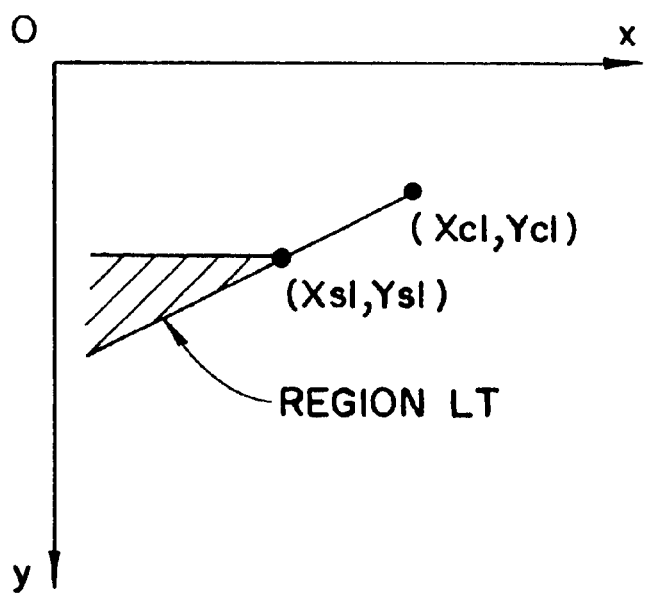

FIG. 4(B) shows the region LT (slashed portion). The black pixel first detected in the region LT is newly defined as a left quasi-reference pixel Sl (Step 302). In other words, the left quasi-reference pixel Sl already detected is replaced with the black pixel newly detected. Every time when a left quasi-reference pixel Sl is newly detected, the process of Steps 302 and 304 is repeated regarding to the region LT set up newly on the basis of the left quasi-reference pixel Sl newly detected. When any black pixel is not detected inside the region LT, the processing is stopped.

In order to reduce the processing amount by the left quasi-reference detecting unit 32, it is possible to restrict the range of scan as follows. The range of the region LS may be defined as $$LS=\{(x, y)|Xside1\leq x<Xcl, Ycl<y\leq YMAX1\} \quad (3)$$

The range of the region LT may be defined as $$LT=\{(x, y)|(Xcl-Xsl)(y-Ycl)<(Ycl-Ysl)(x-Xcl), Xside1\leq x, Ysl<y\leq YMAX1\} \quad (4)$$

Where, Xside1 designates the limited value of the left quasi-reference point in the left direction on the basis of the X coordinate of the left reference point, and YMAX1 designates the limited value in the lower direction on the basis of the Y coordinate of the left reference point, each value being a constant arbitrarily set up.

Figure 5:
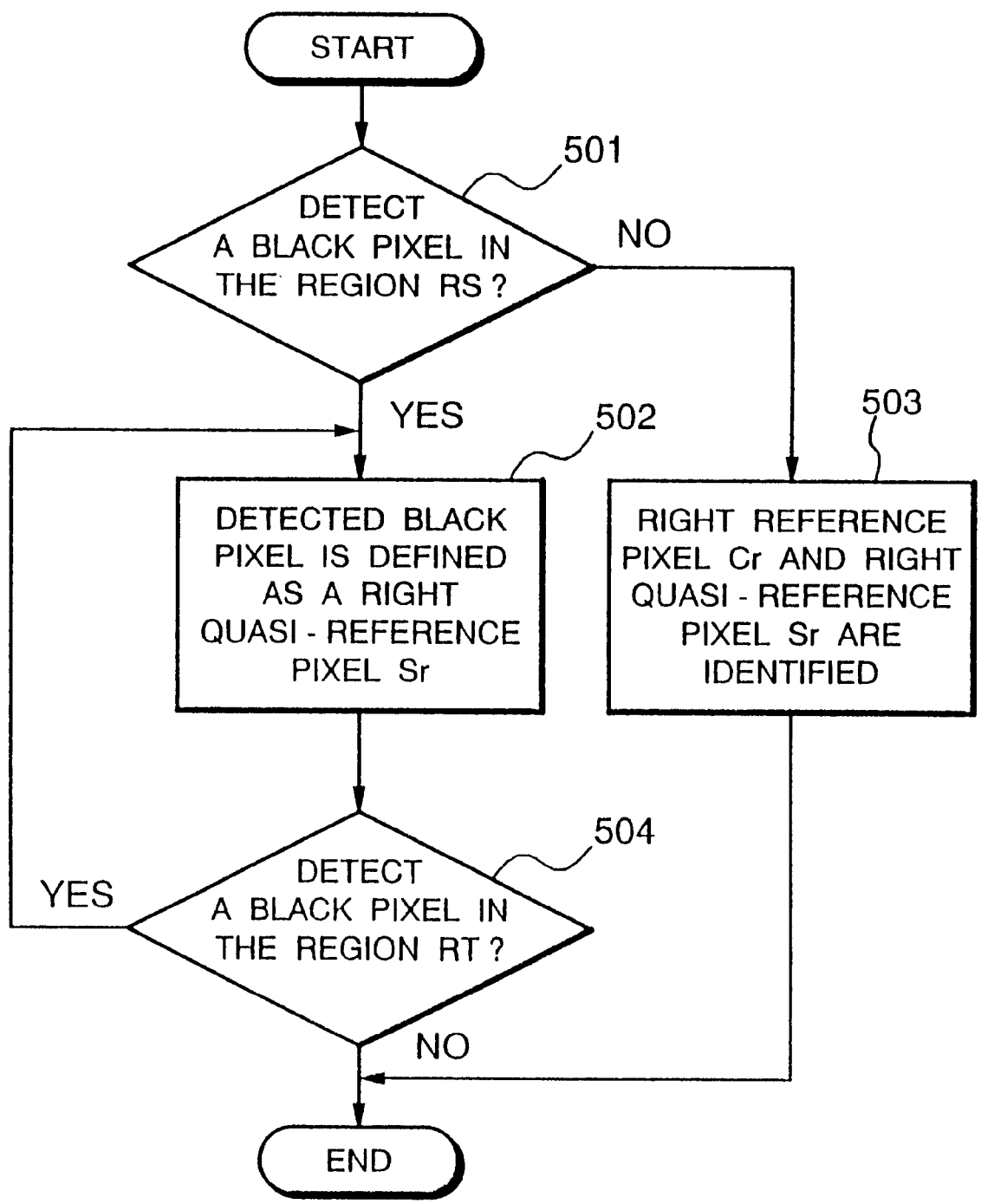
FIG. 5 is a flow chart showing an operation by a right reference detecting unit.

FIG. 5 is a flow chart showing the operation of the right quasi-reference detecting unit 33, and FIG. 6 is a view showing the content of the processing by the right quasi-reference detecting unit 33.

The right quasi-reference detecting unit 33 scans the region RS obtained by the following formula (5) on the basis of the coordinates (Xcr, Ycr) of the right reference pixel Cr, along the Y-axis downward from the top by one line and along the X-axis from left to right, until detecting a black pixel.

$$RS=\{(x, y)|Xcr<x, Ycr<y\} \quad (5)$$

Figure 6A:
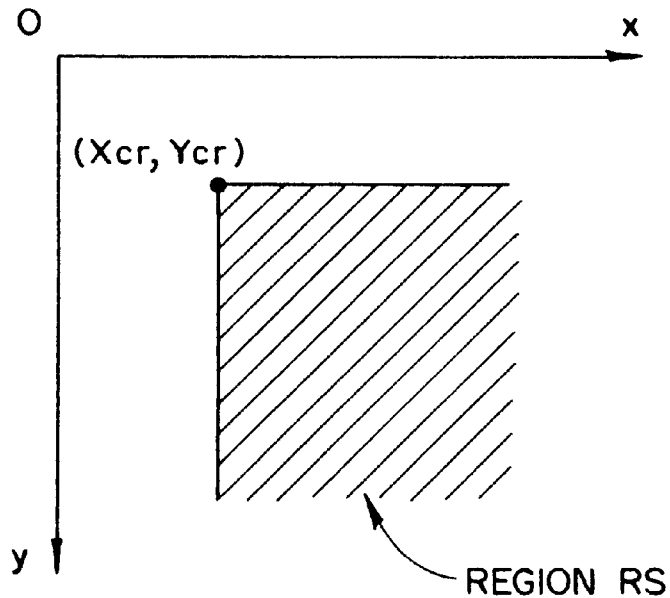
FIG. 6 is a view showing the content of processing by the right reference detecting unit.

FIG. 6(A) shows the region RS (slashed portion). The black pixel first detected in the region RS is temporarily defined as a right quasi-reference pixel Sr (Steps 501 and 502). When any black pixel is not detected, the right reference pixel Cr and the right quasi-reference pixel Sr are identified, and the processing is stopped here (Step 503).

When the right quasi-reference pixel Sr is detected in the region RS, the right quasi-reference detecting unit 33 scans the region RT obtained by the following formula (6) on the basis of the line connecting the right reference pixel Cr and the right quasi-reference pixel Sr and the coordinates (Xsr, Ysr) of the right quasi-reference pixel Sr, along the Y-axis downward from the top by one line and along the X-axis from left to right, until detecting a black pixel.

$$RT=\{(x, y)|(Xcr-Xsr)(y-Ycr)>(Ycr-Ysr)(x-Xcr), Ysr<y\} \quad (6)$$

Figure 6B:
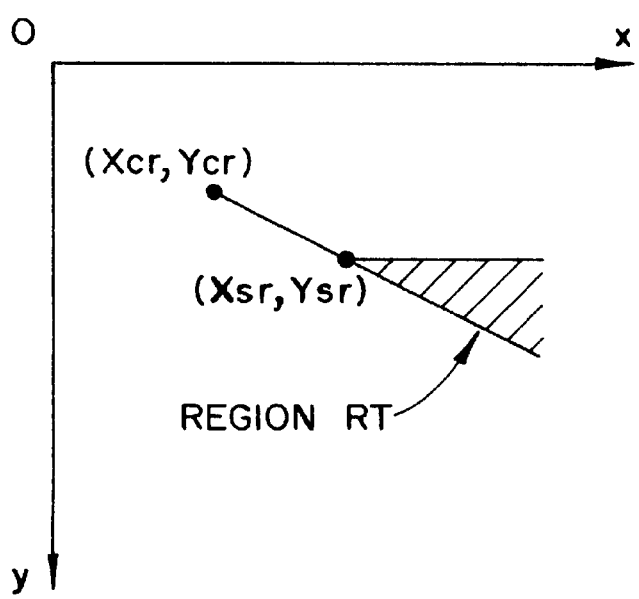

FIG. 6(B) shows the region RT (slashed portion). The black pixel first detected is newly defined as a right quasi-reference pixel Sr (Step 302). In other words, the right quasi-reference pixel Sr already detected is replaced with the black pixel newly detected. Every time when a right quasi-reference pixel Sr is newly detected, the process of Steps 302 and 504 are repeated regarding to the region RT newly set up on the basis of the new right quasi-reference pixel Sr. When any black pixel is not detected, the processing is stopped.

In order to reduce the processing amount by the right quasi-reference detecting unit 33, it is possible to restrict the range of scan as follows. The range of the region RS may be defined as $$RS=\{(x, y)|Xcr<x \leq Xside2, Ycr<y \leq YMAX2\} \quad (7)$$

The range of the region RT may be defined as $$RT=\{(x, y)|(Xcr-Xsr)(y-Ycr)>(Ycr-Ysr)(x-Xcr), x \leq Xside2, Ysr<y \leq YMAX2\} \quad (8)$$

Where, Xside2 designates the limited value of the right quasi-reference point in the right direction on the basis of the X coordinate of the right reference point, and YMAX2 designates the limited value in the lower direction on the basis of the Y coordinate of the right reference point, each value being a constant arbitrarily set up.

Thus, the tangent detecting unit 30 supplies the information on the segment connecting the left reference pixel Cl and the left quasi-reference pixel Sl and the information on the segment connecting the right reference pixel Cr and the right quasi-reference pixel Sr to the tilt deciding unit 40 as the tangent information on the representative tangent TR.

This time, an operation of the tilt deciding unit 40 will be described in detail.

Upon the receipt of the tangent information on the representative tangent TR from the tangent detecting unit 30, the tilt deciding unit 40 makes a comparison between the distance L interconnecting contact points, that is length of the segment interconnecting the left reference pixel Cl and the left quasi-reference pixel Sl, and the distance R interconnecting contact points, that is the length of the segment interconnecting the right reference pixel Cr and the right quasi-reference pixel Sr. The reference pixel and quasi-reference pixel interconnected by the longer distance is defined as a representative tangent reference pixel Cc and representative tangent quasi-reference pixel Sc. The segment connecting the representative tangent reference pixel Cc and representative tangent quasi-reference pixel Sc obtained in this way is the representative tangent serving as a reference for requiring the tilt of the character string.

Figure 7:
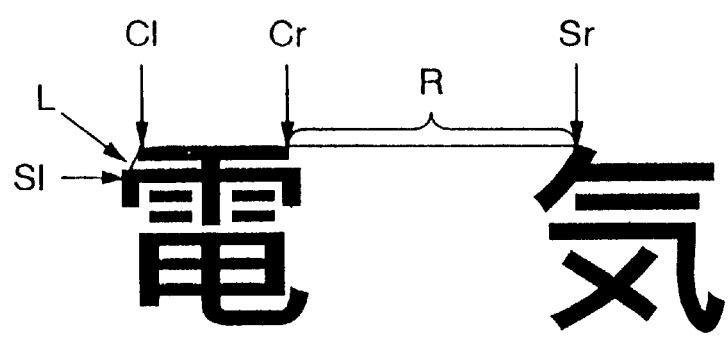
FIG. 7 is a view showing an example of detecting each reference and quasi-reference point as well as an example of distances L and R between contact points.

FIG. 7 shows an example of detecting each reference point and each quasi-reference point, as well as each distance between contact points L and R. In this example, the distance R is longer than the distance L. Accordingly, the right reference point pixel Cr is regarded as a representative tangent reference pixel Cc and the right quasi-reference pixel Sr is regarded as a representative tangent quasi-reference pixel Sc. Additionally, as a special example, when the left reference pixel Cl and the left quasi-reference pixel Sl are identified, the right reference pixel Cr is regarded as the representative tangent reference pixel Cc and the right quasi-reference pixel Sr is regarded as the representative tangent quasi-reference pixel Sc. When the right reference pixel Cr and the right quasi-reference pixel Sr are identified, the left reference pixel Cl is regarded as the representative tangent reference pixel Cc and the left quasi-reference pixel Sl is regarded as the representative tangent quasi-reference pixel Sc. When the left reference pixel Cl and left quasi-reference pixel Sl are identified, and the right reference pixel Cr and right quasi-reference pixel Sr are identified, the left reference pixel Cl is regarded as the representative tangent reference pixel Cc and the right reference pixel Cr is regarded as the representative tangent quasi-reference pixel Sc.

The tilt deciding unit 40 requires the tilt angle θ of the representative tangent from the coordinates (Xcc, Ycc) of the representative tangent reference pixel Cc and the coordinates (Xsc, Ysc) of the representative tangent quasi-reference pixel Sc, by the following formula (9).

$$\theta = \text{Arctan}(Ysc-Ycc)/(Xsc-Xcc)) \quad (9)$$

The tilt θ of the representative tangent obtained by the above formula (9) is recognized as the tilt of the character string, which is supplied to the tilt correcting unit 50. The tilt correcting unit 50 corrects the image data DC according to the tilt of the character string obtained as mentioned above.

As a special example, when the distance L is equal to the distance R, the tilt angle of the segment interconnecting the left reference pixel Cl and the left quasi-reference pixel Sl and the tilt angle of the segment interconnecting the right reference pixel Cr and the right quasi-reference pixel Sr are both required, and the tilt angle of which absolute value is closer to zero is defined as the tilt angle θ of the representative tangent. When the distances L and R are equal and the absolute values of the tilt angles of the both segments are equal, the tilt angle is defined as zero (θ=0).

In the first embodiment as mentioned above, the reference point detecting unit 31 detects two points, the left reference pixel Cl and the right reference pixel Cr. However, when it is desired to speed up processing even if decreasing a bit of accuracy, assuming that the right reference pixel Cr and the left reference pixel Cl are identified, the detection of only the left reference pixel Cl allows the detection of the representative tangent and the calculation of the tangent angle θ, thereby decreasing the processing amount.

A second embodiment of the present invention will be described hereinafter.

Figure 8:
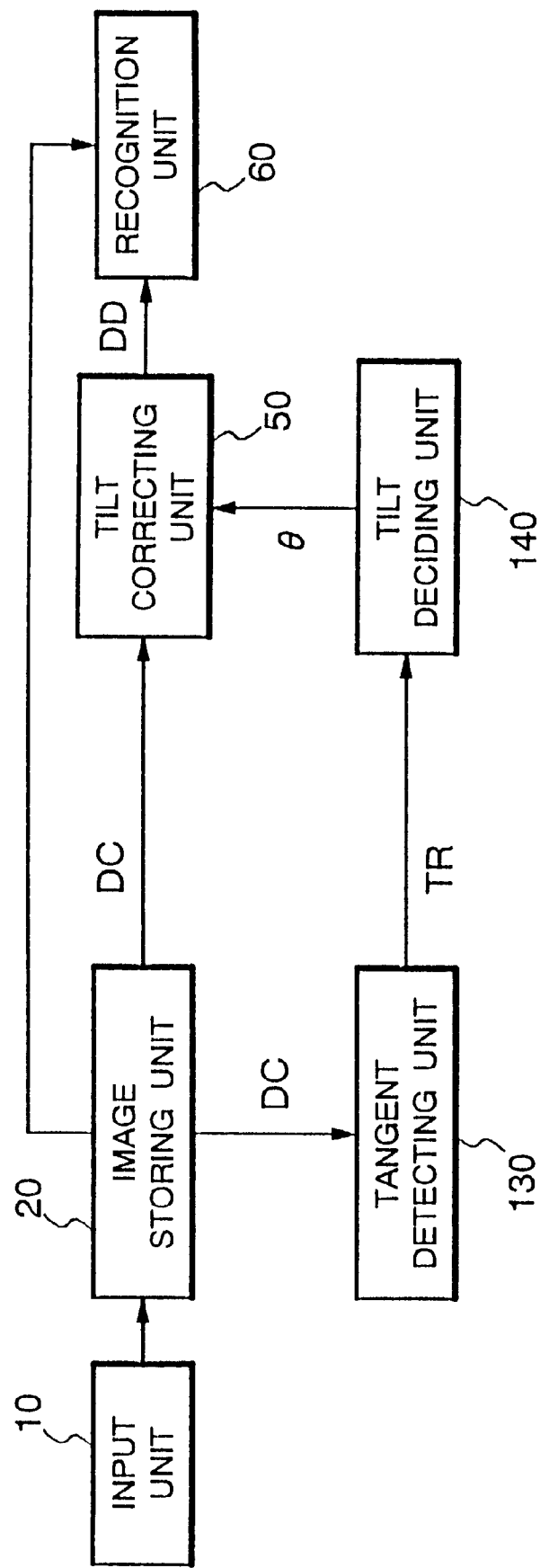
FIG. 8 is a block diagram showing the constitution of a character reader according to a second embodiment of the present invention.

FIG. 8 is a block diagram showing the constitution of a character reader according to the second embodiment of the present invention.

As illustrated in FIG. 8, the character reader of this embodiment comprises an input unit 10 for entering image data of handwritten characters and printed characters, an image storing unit 20 for storing the entered image data, a tangent detecting unit 130 and a tilt deciding unit 140 for detecting a tangent of black pixel forming character within the image data and detecting the tilt of the character string, a tilt correcting unit 50 for correcting the tilt on the image data according to the tilt of the character string decided by the tilt deciding unit 40, and a recognition unit 60 for performing character recognition on the basis of the image data corrected by the tilt correcting unit 50. Of the above components, the input unit 10, the image storing unit 20, the tilt correcting unit 50 and the recognition unit 60 have the same structure as those of the first embodiment. Therefore, the description thereof is omitted here, with the same reference numerals attached thereto.

Figure 9:
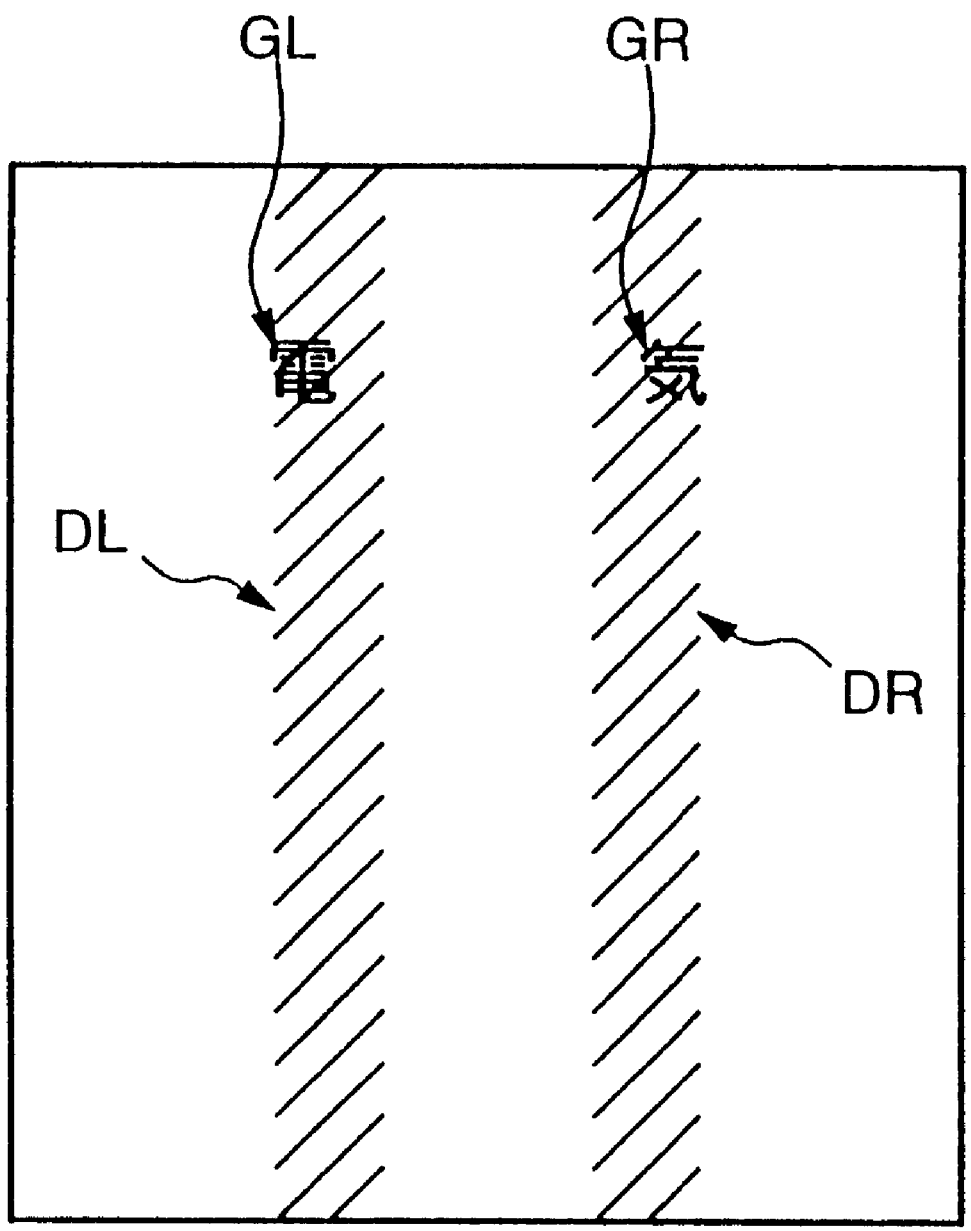
FIG. 9 is a view showing the content of processing by a tangent detecting unit.

The tangent detecting unit 130 is realized by a CPU controlled by a program, or the like, which detects the tangent information TR on a tangent coming into contact with a predetermined black pixel within the image data received from the image storing unit 20. A detecting operation of the tangent information TR by the tangent detecting unit 130 will be described with reference to FIG. 9.

The tangent detecting unit 130 requires, in the image data DC, the two regions DL and DR obtained by the following formulas (10) and (11).

$$DL=\{(x, y)|Xlmin<x<Xlmin+W\} \quad (10)$$

$$DR=\{(x, y)|<b]old51\ Xrmax-W<x<Xrmax\} \quad (11)$$

Where, XLmin indicates the minimum value in the direction of the X-axis, of the group of black pixels forming the character string on the same line, and XRmax indicates the maximum value in the direction of the X-axis, of the group of black pixels forming the character string on the same line. In other words, the both values are the coordinates of the X-axis, respectively indicating the black pixel located on the left end of the character which is located on the left end portion of the character string on the same line and the black pixel located on the right end of the character which is located on the right end portion thereof. W is a constant for specifying the width of the regions DL and DR set up larger than the width for one character. In the case as shown by the following formula, $$Xlmin+W \geq Xrmax-W \quad (12)$$

the right end of the region DL is moved to the left end of the region DR as follows, $$DL=\{(x, y)|Xlmin<x<Xrmax-W\} \quad (13)$$

so that the regions DL and DR should not overlap each other.

The tangent detecting unit 130 scans the regions DL and DR, respectively along the direction of the Y-axis downward from the top by one line, along the direction of the X-axis from left to right, until detecting a black pixel. The black pixel detected from the region DL is defined as a left reference pixel GL and the black pixel detected from the region DR is defined as a right reference pixel GR. FIG. 7 shows an example of the regions DL and DR as well as the left reference pixel GL and right reference pixel GR.

Then, the tangent detecting unit 130 supplies the information on the segment connecting the detected left reference pixel GL and right reference pixel GR to the tilt deciding unit 140 as the tangent information on the representative tangent TR.

The tilt deciding unit 140 is realized by a CPU controlled by a program, or the like, which decides a representative tangent according to the tangent information TR detected by the tangent detecting unit 30, and requires the tilt of the character string within the image data according to the tilt of the representative tangent. More specifically, the tilt angle θ of the representative tangent passing the coordinates (Xl, Yl) of the left reference pixel GL and the coordinates (Xr, Yr) of the right reference pixel GR is required by the following formula (14). Then, the tilt deciding unit 140 delivers the obtained tilt angle * being recognized as the tilt of the character string to the tilt correcting unit 50.

$$\theta=Arctan(Yl-Yr)/(Xl-Xr) \quad (14)$$

Although the preferred embodiments have been described as mentioned above, the present invention is not restricted to the above embodiments, but it is to be understood that various modifications is possible in the light of the above teachings. For example, as a method of requiring a representative tangent decided by the longer distance between contact points, various methods can be used depending on the desired accuracy and processing speed, in which, e.g., it is possible to select the longest tangent by requiring all the tangents coming into contact with the region of the black pixels.

In the case of a document such that the writing starting position in each line is constant in the vertical direction, it is possible to obtain the tangent of the black pixel on the left end portion of the image by replacing the X coordinate with the Y coordinate and the Y coordinate with the X coordinate on the contrary, so to correct the tilt of the document by the use of the tilt of the tangent.

The character reader according to the present invention can be also adopted in the case of only detecting and correcting the tilt of the image in a filing system or in copying machine. The recognition unit for performing character recognition is not an indispensable component in such a case.

As set forth hereinabove, provided with the tangent detecting unit for detecting a representative tangent which can be a reference for requiring the tilt of a character string, from the tangents coming into contact with the black pixels forming the character string within the image data, and the tilt deciding unit for deciding the tilt of the character string on the basis of the tilt on the representative tangent, the character reader of the present invention is capable of requiring the tilt of the image data by the use of only the tangent in contact with the black pixel within the image data, without discerning the characters from the image data and scanning the whole image data in order to require the tilt. Accordingly, the character reader of the present invention has an effect such as to decrease the processing amount necessary for detecting and correcting the tilt of the image data, thereby speeding up the processing.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A character reader for optically reading and entering characters, comprising:

an input means for reading characters by a scanner-type photoelectric transfer means as an image, creating image data formed by binary pixels of white and black lying on a plain surface, and entering the image data;

a tangent detecting means for detecting tangent information on tangents contacting with black pixels forming a character string within the image data; and a tilt deciding means for deciding a representative tangent which is representative of the direction of a character string, from the above-mentioned tangents, on the basis of the tangent information detected by said tangent detecting means;

wherein said tangent detecting means includes:

a reference point detecting means for detecting a first black pixel that is a black pixel first detected by scanning the image data from the top portion by one line in a constant direction and a second black pixel that is a black pixel located at the distal end on the opposite side to a group of black pixels sequentially lying from the first black pixel in the scanning direction;

a first quasi-reference detecting means for detecting a third black pixel that is a black pixel first detected by scanning a first region obtained by a predetermined condition on the basis of the coordinates of the first black pixel, from the top portion by one line in the same direction as the scanning direction; and a second quasi-reference detecting means for detecting a fourth black pixel that is a black pixel first detected by scanning a second region obtained by a predetermined condition on the basis of the coordinates of the second black pixel, from the top portion by one line in the same direction as the scanning direction; and wherein said tilt deciding means, by comparison between the segment connecting the first black pixel and the third black pixel and the segment connecting the second black pixel and the fourth black pixel, decides the longer segment of the two as the representative tangent.

2. A character reader as set forth in claim 1, wherein said tangent detecting means defines a black pixel first detected by scanning the image data from the top portion by one line in a constant direction as a first black pixel, so to detect a first tangent extending from the first black pixel on the opposite side to the scanning direction, and defines a black pixel at the distal end on the opposite side to a group of black pixels sequentially lying from the first black pixel in the scanning direction as a second black pixel, so to detect a second tangent extending from the second black pixel on the same side as the scanning direction; and said tilt deciding means decides the longer one of the first and second tangents as the representative tangent.

3. A character reader as set forth in claim 1, wherein said tangent detecting means defines a black pixel first detected by scanning the image data from the top portion by one line in the direction from left to right as a first black pixel, so to detect a first tangent extending leftward from the first black pixel, and defines a black pixel located at the distal end of a group of black pixels sequentially lying in the scanning direction from the first black pixel as a second black pixel, so to detect a second tangent extending rightward from the second black pixel; and said tilt deciding means decides the longer one of the first and second tangents as the representative tangent.

4. A character reader as set forth in claim 1, wherein said tangent detecting means requires a first region including one distal end of the character string and extending at right angle to the direction of row of the character string with a constant width, and a second region including another distal end of the character string and extending at right angle to the direction of row of the character string with a constant width, defines a black pixel first detected by scanning the first region from the top portion of the image data by one line in a constant direction as a first black pixel, and defines a black pixel first detected by scanning the second region from the top portion of the image data by one line in a constant direction as a second black pixel; and said tilt deciding means decides the segment connecting the first black pixel and the second black pixel as the representative tangent.

5. A character reader as set forth in claim 1, wherein said tangent detecting means requires a first region including the left end of the character string and extending vertically with a constant width, and a second region including the right end of the character string and extending vertically with a constant width, defines a black pixel first detected by scanning the first region from the top portion of the image data by one line in the direction from left to right as a first black pixel, and defines a black pixel first detected by scanning the second region from the top portion of the image data by one line in the direction from left to right as a second black pixel; and said tilt deciding means decides the segment connecting the first black pixel and the second black pixel as the representative tangent.

6. A character reader for reading and entering characters by optical methods, comprising:

an input means for reading characters by a scanner-type photoelectric transfer means as an image, creating image data formed by binary pixels of white and black lying on a plain surface, and entering the image data;

a tangent detecting means for detecting tangent information on tangents contacting with black pixels forming a character string within the image data;

a tilt deciding means for deciding a representative tangent which is representative of the direction of a character string, from the above-mentioned tangents, on the basis of the tangent information detected by said tangent detecting means;

a correcting means for correcting the imaged data on the basis of the tilt of the image data obtained by said tilt deciding means; and a recognition means for performing character recognition by the use of pattern matching on the image data corrected by said correcting means;

wherein said tangent detecting means includes:

a reference point detecting means for detecting a first black pixel that is a black pixel first detected by scanning the image data from the top portion by one line in a constant direction and a second black pixel that is a black pixel located at the distal end on the opposite side to a group of black pixels sequentially lying from the first black pixel in the scanning direction;

a first quasi-reference detecting means for detecting a third black pixel that is a black pixel first detected by scanning a first region obtained by a predetermined condition on the basis of the coordinates of the first black pixel, from the top portion by one line in the same direction as the scanning direction; and a second quasi-reference detecting means for detecting a fourth black pixel that is a black pixel first detected by scanning a second region obtained by a predetermined condition on the basis of the coordinates of the second black pixel, from the top portion by one line in the same direction as the scanning direction; and wherein said tilt deciding means, by comparison between the segment connecting the first black pixel and the third black pixel and the segment connecting the second black pixel and the fourth black pixel, decides the longer segment of the two as the representative tangent.

7. A character reader as set forth in claim 6, wherein said tangent detecting means defines a black pixel first detected by scanning the image data from the top portion by one line in a constant direction as a first black pixel, so to detect a first tangent extending from the first black pixel on the opposite side to the scanning direction, and defines a black pixel at the distal end on the opposite side to a group of black pixels sequentially lying from the first black pixel in the scanning direction as a second black pixel, so to detect a second tangent extending from the second black pixel on the same side as the scanning direction; and said tilt deciding means decides the longer one of the first and second tangents as the representative tangent.

8. A character reader as set forth in claim 6, wherein said tangent detecting means requires a first region including one distal end of the character string and extending at right angle to the direction of row of the character string with a constant width, and a second region including another distal end of the character string and extending at right angle to the direction of row of the character string with a constant width, defines a black pixel first detected by scanning the first region from the top portion of the image data by one line in a constant direction as a first black pixel, and defines a black pixel first detected by scanning the second region from the top portion of the image data by one line in a constant direction as a second black pixel; and said tilt deciding means decides the segment connecting the first black pixel and the second black pixel as the representative tangent.

9. A character reader for optically reading and entering characters, comprising:

an input means for reading characters by a scanner-type photoelectric transfer means as an image, creating image data formed by binary pixels of white and black lying on a plain surface, and entering the image data;

a tangent detecting means for detecting tangent information on tangents contacting with black pixels forming a character string within the image data; and a tilt deciding means for deciding a representative tangent which is representative of the direction of a character string, from the above-mentioned tangents, on the basis of the tangent information detected by said tangent detecting means;

wherein said tangent detecting means includes:

a reference point detecting means for detecting a first black pixel that is a black pixel first detected by scanning the image data from the top portion by one line in the direction from left to right and a second black pixel that is a black pixel located at the distal end on the right side of a group of black pixels sequentially lying from the first black pixel in the right direction;

a first quasi-reference detecting means for detecting a third black pixel that is a black pixel first detected by scanning a first region extending leftward and downward from the coordinates of the first black pixel, which region is obtained by a predetermined condition, from the top portion by one line in the same direction as the scanning direction; and a second quasi-reference detecting means for detecting a fourth black pixel that is a black pixel first detected by scanning a second region extending rightward and downward from the coordinates of the second black pixel, which region is obtained by a predetermined condition, from the top portion by one line in the same direction as the scanning direction; and wherein said tilt deciding means, by comparison between the segment connecting the first black pixel and the third black pixel and the segment connecting the second black pixel and the fourth black pixel, decides the longer segment of the two as the representative tangent.

* * * * *